124,191

UNITED STATES PATENT OFFICE.

RICHARD S. GILLESPIE AND FREDRACK ZIESING, OF NEW YORK, N. Y.

IMPROVEMENT IN WOVEN FELTED FABRICS FOR BONNETS, &c.

Specification forming part of Letters Patent No. 124,191, dated February 27, 1872.

*To all whom it may concern:*

Be it known that we, RICHARD S. GILLESPIE and FREDRACK ZIESING, both of the city, county, and State of New York, have invented a certain new and useful Composition for Covering Materials, such as Woven and Felted Tissues, Leather, or analogous substances, or articles made of these materials; and the following is a full, clear, and exact description of the same.

Our invention consists in a composition, which, when applied to materials such as woven and felted tissues, leather, or analogous substances, or articles made of these materials, forms a body of such quality that, when an impression is made with ornamental dies of any configuration, it receives and retains the impression, is pliable, tenacious, not liable to crack, peel off, nor discolor by exposure to the atmosphere, or become sticky when exposed to the heat of the sun, is water-proof and non-poisonous. Our composition is more particularly devised for the imitation of straw hats, small work-baskets, boxes, or analogous articles.

To enable those skilled in the art to make and use our invention, we will proceed to describe its preparation and application.

The composition is composed of the following substances: Boiling water, eight gallons; zinc white, one and a half pound; chalk, finely powdered, quarter of a pound; spermaceti, finely scraped, one ounce; white bees-wax, finely scraped, one-half ounce; white rosin, finely powdered, one ounce; glycerine, one gill; brown varnish, one-half gill; gelatine, one-quarter of a pound; starch, one pound, or two ounces of fine glue; alum, one and a half ounce; and is prepared and applied in the following manner—to wit: add to the boiling water, first the zinc-white and powdered chalk, stirring the whole well together; then add quickly and separately the rest of the above-named substances, care being taken to keep the whole boiling and well stirred until the mixture of the mass is complete; we next pass the whole through a common paint-mill to insure a thorough unity of the whole, when the composition will be ready for use, and can be used either in a cold or hot state, and can be applied to any fabric or molded article with a common paint-brush. For the covering of hats, caps, bonnets, or analogous articles, which are to be acted upon by ornamented dies, in practice it is found best to coat the articles twice, as the desired thickness of composition for receiving the impression cannot very well be obtained by one coating without running the risk of making the coating uneven. Immediately after the first coat is applied we slightly dust over its surface some cotton flock, and, in some cases, woolen flock, which increases its tenacity. When the first coat is dry the second can be applied, and when dry, we slightly dust over its surface some finely-powdered chalk to prevent its surface from adhering to the die. The face of the male die must be smooth, and covered over with rubber, leather, or some yielding material, so that if it ever comes into direct contact with the female die, the surfaces of the female die will not be injured thereby. The female die is placed at the bottom of the press into which the molded article is placed. The male die is then brought into close contact with the molded article by pressure, so that the composition on the molded article receives the impression from the female die. The pressure is generally given to the dies by a "flying screw-press," such as are used for stamping. For the production of articles in imitation of straw, or other natural or ornamental designs, we prefer to use a single thickness of muslin or other woven fabric, as that is easily obtained, and answers all purposes for the body or base of the article, and upon which the composition is spread, as above described; but any other analogous fabric or fibrous texture will answer, in most cases.

We do not confine ourselves to the proportions herein given, as in the manufacture of some articles coated with this composition they would have to be varied, especially when the ornamented die is very much raised; then the coating must have its tenacity and pliability increased by the addition of more cotton or wool flock and gelatine.

We do not claim to be the first inventors of ornamented dies for the imitation of straw hats, bonnets, and other articles, as such imitation has long been in use, but the impression was given directly to the molded articles without the interposition of any such composition; neither do we claim to be the first to invent a composition for covering such articles, as a composition for such purposes is known and in use, but is different in substance and in its application from that above described.

Having thus described our invention, what we claim, and desire to secure by Letters Patent, is—

The compound for forming an imitation surface upon fibrous or textile fabrics, leather, or analogous substances, composed of the ingredients and in the proportions substantially as described.

RICHARD S. GILLESPIE.
FREDRACK ZIESING.

Witnesses:
A. STELEY,
E. W. HIRSH.